(12) United States Patent
Richards

(10) Patent No.: US 8,876,066 B1
(45) Date of Patent: Nov. 4, 2014

(54) HANGER WITH BOLT CLOSURES

(75) Inventor: Peter S. Richards, Seattle, WA (US)

(73) Assignee: Progressive Fastening, Inc., Seattle, WA (US)

( * ) Notice: Subject to any disclaimer, the term of this patent is extended or adjusted under 35 U.S.C. 154(b) by 516 days.

(21) Appl. No.: 12/837,037

(22) Filed: Jul. 15, 2010

Related U.S. Application Data (60) Provisional application No. 61/287,491, filed on Dec. 17, 2009.

(51) Int. Cl.
*F16L 3/00* (2006.01)

(52) U.S. Cl.
USPC .................... 248/62; 248/58; 248/70; 248/55

(58) Field of Classification Search
USPC ......... 248/62, 49, 55, 58, 60, 74.1, 71, 59, 70
See application file for complete search history.

(56) References Cited

U.S. PATENT DOCUMENTS

| | | | | |
|---|---|---|---|---|
| 1,382,799 | A * | 6/1921 | Purple | 24/37 |
| 3,221,790 | A * | 12/1965 | Poupitch | 411/301 |
| 3,353,580 | A * | 11/1967 | Benjamin | 411/303 |
| 3,461,936 | A | 8/1969 | Rosan, Sr. et al. | |
| 3,886,989 | A | 6/1975 | Strange | |
| 3,887,990 | A * | 6/1975 | Wilson | 29/450 |
| 3,967,669 | A * | 7/1976 | Egner | 411/184 |
| 4,019,550 | A * | 4/1977 | DeHaitre | 411/303 |
| 4,481,702 | A * | 11/1984 | Mitchell | 29/432 |
| 4,550,890 | A * | 11/1985 | Redman et al. | 248/59 |
| 4,555,066 | A * | 11/1985 | Gibson | 241/293 |
| 4,735,386 | A | 4/1988 | Richards | |
| 4,858,860 | A * | 8/1989 | Richards | 248/62 |
| 5,007,604 | A * | 4/1991 | Richards | 248/62 |
| 5,092,547 | A * | 3/1992 | Richards | 248/62 |
| 5,161,357 | A * | 11/1992 | Braunberger et al. | 56/3 |
| 5,599,131 | A * | 2/1997 | Julen et al. | 403/312 |
| 5,695,297 | A * | 12/1997 | Geib | 403/371 |
| 5,746,561 | A | 5/1998 | Nygren, Jr. et al. | |
| 5,752,793 | A | 5/1998 | Wu | |
| 6,932,044 | B1 * | 8/2005 | Fenech | 123/195 C |
| 7,077,263 | B1 * | 7/2006 | Richardson et al. | 198/844.2 |
| 7,101,135 | B2 | 9/2006 | Hassed | |
| 7,322,777 | B2 * | 1/2008 | Jager et al. | 408/153 |
| 7,325,776 | B2 * | 2/2008 | Shibuya | 248/62 |
| 7,546,986 | B2 * | 6/2009 | Kim | 248/62 |

(Continued)

*Primary Examiner* — Terrell McKinnon
*Assistant Examiner* — Monica Millner
(74) *Attorney, Agent, or Firm* — Dwayne E. Rogge; Schacht Law Office, Inc.

(57) ABSTRACT

A pipe hanger method and apparatus wherein a bolt is threaded upwardly through a first opening within a lower arm portion of a saddle, then, in one form, through an opening in a liner, then through a larger opening in the upper arm portion of the saddle. The opening is non-cylindrical in shape. A nut is then installed on the bolt. The nut has a tapered end portion which interoperates with the shape of the opening in the upper arm of the saddle. The nut is hand-tightened and then is aligned with the opening so that the small end portion would drop into the opening. A wrench is then used on the head of the bolt to rotate the bolt for the purpose of drawing the nut and bolt together and applying a clamping force on a pipe positioned within the saddle. The liner extends along the inside of the bolt and then extends about the pipe, between it and the bight of the saddle, and then in one form extends along the inside of the upper arm portion.

4 Claims, 6 Drawing Sheets

(56) References Cited

U.S. PATENT DOCUMENTS

| | | | |
|---|---|---|---|
| 7,775,754 B2 * | 8/2010 | Calandra et al. | 411/5 |
| 8,696,280 B2 * | 4/2014 | Orange et al. | 411/267 |
| 2006/0226300 A1 * | 10/2006 | Shibuya | 248/62 |
| 2007/0131823 A1 * | 6/2007 | Mominee et al. | 248/62 |
| 2010/0108840 A1 * | 5/2010 | Oh et al. | 248/229.1 |

* cited by examiner

HANGER WITH BOLT CLOSURES

RELATED APPLICATIONS

This application claims priority benefit of U.S. Ser. No. 61/287,491, filed Dec. 17, 2009.

BACKGROUND OF THE DISCLOSURE a) Field of the disclosure

This disclosure relates to pipe hangers. More particularly, it relates to an improved side-load, and bottom—load-type pipe hanger and a manner of securing a liner in place within such hanger.

b) Background Art

The present invention relates to an improvement of the pipe hanger disclosed by Applicant's U.S. Pat. Nos. 5,007,604 and 4,735,386, incorporated herein by reference.

DESCRIPTION OF THE PREFERRED EMBODIMENTS

Figure 1:
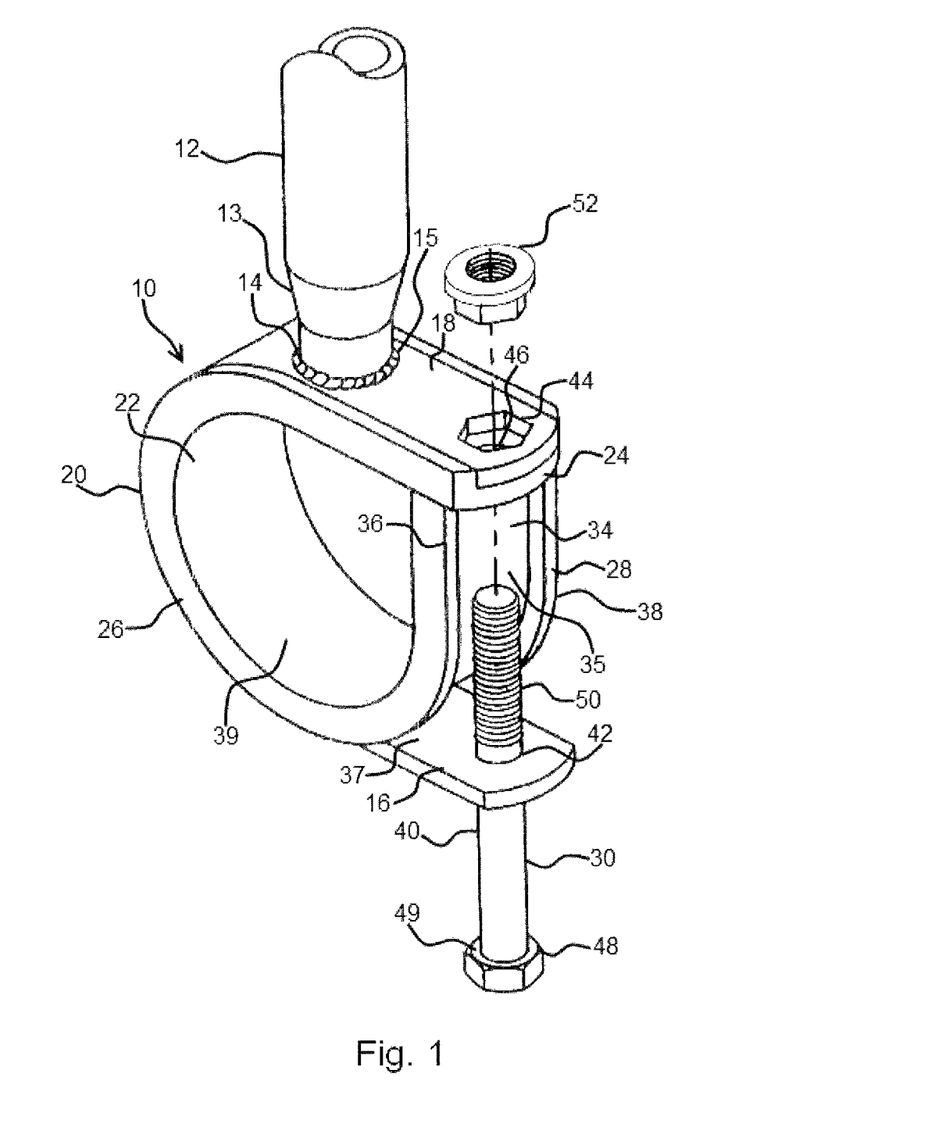
FIG. 1 is an isometric, partially exploded view of an improved side-load hanger in one form.

Referring to FIG. 1, the disclosed embodiment comprises a saddle 10, which in basic configuration may be like saddle 10 of the prior art hanger disclosed by the aforementioned U.S. Pat. No. 4,735,386. The saddle 10 may be supported by a support leg 12, which is welded at its lower end at weld 14, to an upper portion of the saddle 10. Saddle 10 includes a first or lower arm portion 16, a second or upper arm portion 18, and an interconnecting bight portion 20.

A liner 22 is received within the inner space of the saddle. In accordance with the invention, the liner has an elongated side portion 24 that extends along arm portion 18 of the saddle 10, a rounded bight portion 26 which extends around the bight portion 20 of the saddle 10, and a shorter side portion 28 which extends along side of a bolt 30, between it and the pipe section 32 (see FIG. 3). The liner 22 has a web portion 34 that is substantially as wide as the saddle members 16, 18, 20, and a pair of side flanges 36 and 38 (FIG. 1). In one form, the liner is produced of neoprene, although other materials could be utilized. The flange side 35 of the web 34 makes contact with the inner surfaces 37 of the saddle arm portion 18, the saddle bight portion 20, and a side surface of the rod body 40 of the bolt 30. The opposite side 39 of the web 34 makes contact with about three-fourths of the outer surface of the pipe section 32.

A first opening 42 is provided in the lower arm portion 16. A second and larger non-circular opening 44 is provided in the upper arm portion 18. The centers of openings 42 and 44 in one form are in substantial vertical alignment.

An opening 46 is provided in the web 34 of the liner 22. When the liner 22 is positioned in the manner illustrated, this opening 46 is in alignment with the openings 42 and 44 and allows passage of the rod body 40 of the bolt 30.

The bolt 30 in one form is inserted through the openings 42, 46 and 44. In addition to the rod body 40, the bolt 30 includes an enlarged non-circular head 48 at one end and a threaded portion 50 at its opposite end. The bolt 30 is adapted to mate with the internal threads of an improved nut 52.

Figure 2:
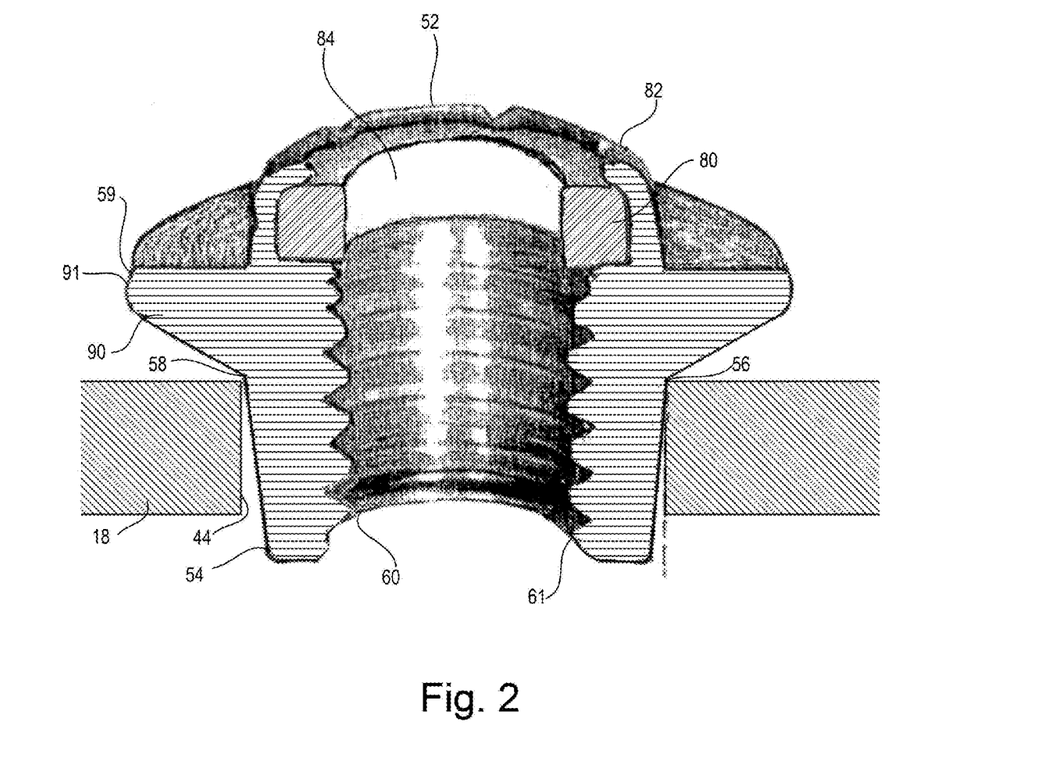
FIG. 2 is a cutaway view of a tapered flange nut in one form.
Figure 4:
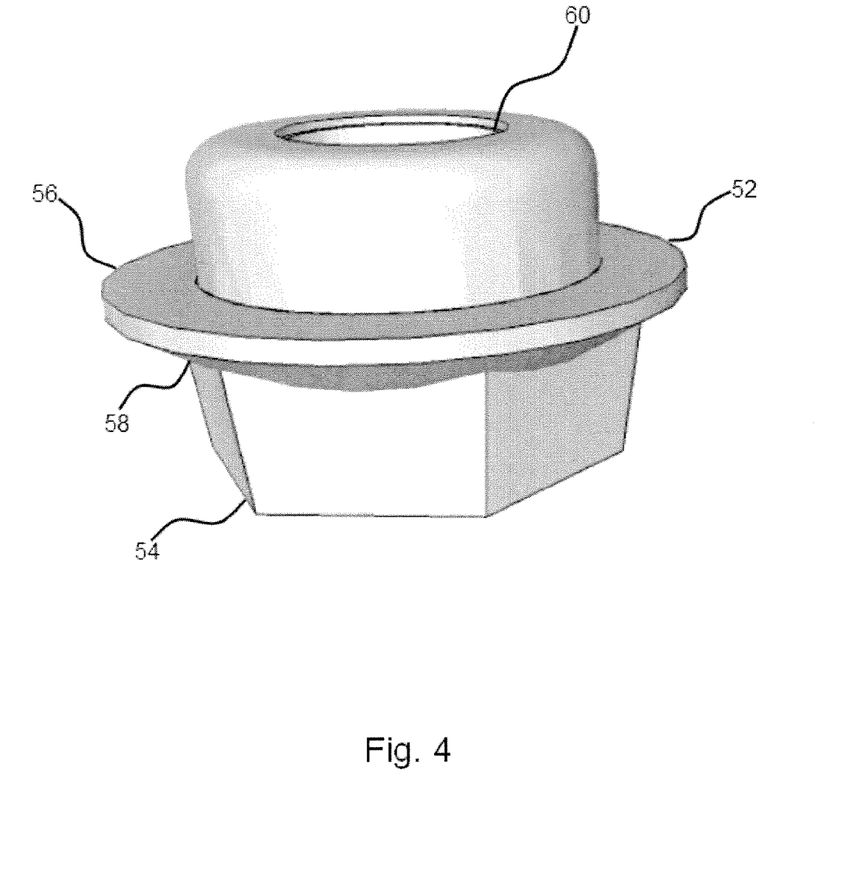
FIG. 4 is a side view of a tapered flange nut in one form.
Figure 5:
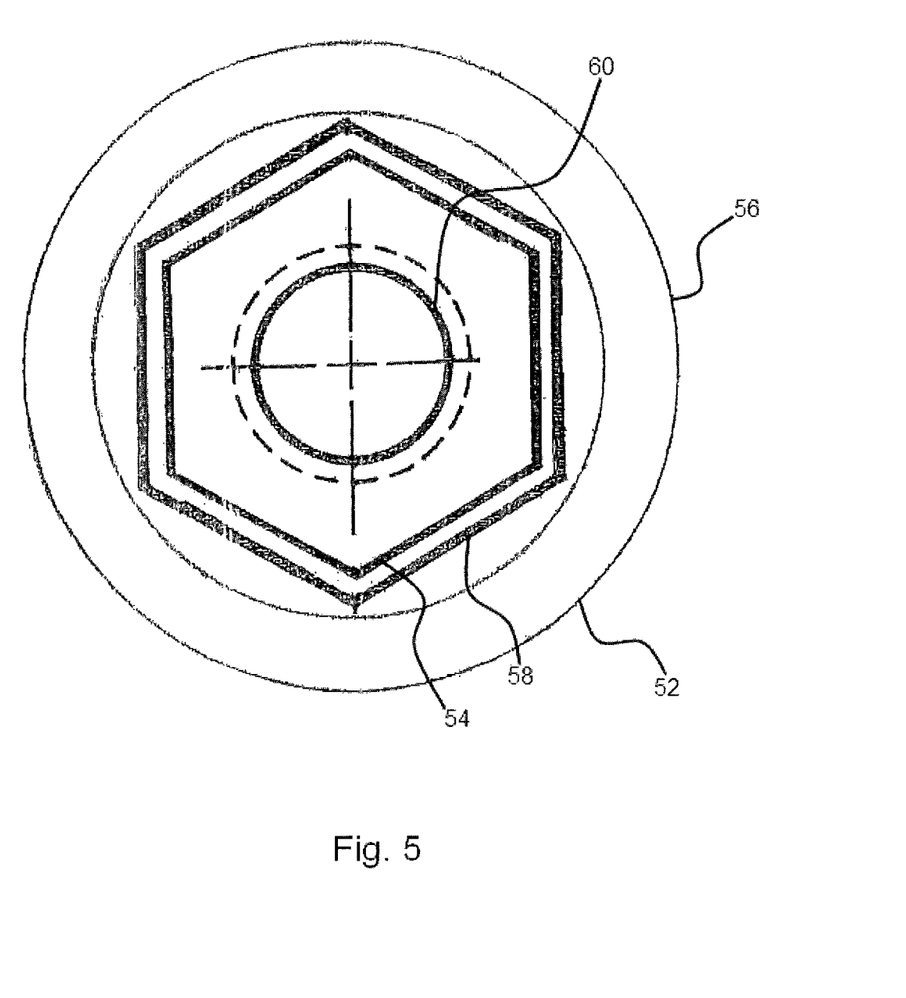
FIG. 5 is a bottom view of a tapered flange nut in one form.

As shown by FIGS. 2, 4 and 5, the nut 52 comprises a tapered end having a small first end portion 54, a larger second end portion 56 and a shoulder 58, defined where the tapered end meets a flange 59. Nut 52 includes a threaded central opening 60 having thread complimentary to the threads on threaded portion 50 of the bolt 30. Nut 52 may also include a non-threaded conical entry 61 or lead threads.

The small end portion 54, in one form, is hexagonal, or comprises a non frusto-conical surface which is tapered from the small end portion 54 outward to the shoulder 58 to engage the inner surface of the hole 44, and once engaged, to prohibit rotation of the nut 52 relative to the saddle 10. As the bolt provides tensile force upon the saddle 10 between the upper portion 18 and the lower portion 16, the tapered portion of the nut 52 provides even greater force resisting rotation.

In one form, the nut 52 may include an insert 80 fixed within the upper edge 82 for hindering undesired rotation of the bolt 30 relative to the nut 52 once installed upon the saddle 10. In one form, an elastic stop insert is utilized or other forms of polymer or deformable material. Although nylon is perhaps the most common material used. Generally, the inner diameter 84 of the insert is smaller than the major diameter of the bolt 30, improving the locking function of the nut 52. The use of such inserts is especially useful when using stainless steel nuts and bolts, which are inherently susceptible to damage when utilized in an interference fit with other stainless steel surfaces. During installation, it may be found necessary to push the bolt/nut assembly 30/52 downward to temporarily seat the tapered surface of the nut within the non-circular opening 46 while the bolt is rotated to the correct torque. This method is especially useful when it is not convenient to reach or see the nut 52, such as in overhead installations. In one form, the shoulder surface 90 of the nut 52, which engages the upper surface of the collar 10, is substantially planar, or, as shown in FIG. 2, may be tapered from the shoulder 58 to the outer edge 91 of the flange 59. During installation, in one form, when the shoulder surface 90 is seated upon the upper edge of the non-circular hole 46 of the upper surface of the saddle 10, as the head 48 of the bolt 30 is also in contact with the saddle, this indicates to the installer that the correct tension has been achieved.

In one form, the small end portion 54 of nut 52 is sized to be snugly received within the opening 44 as previously described, but in at least one embodiment there is no portion for the purpose of permanently securing the nut 52 in place. Rather, the opening 44 functions as a "box" wrench for holding the tapered end portion 54, and hence nut 52, against turning when the end portion 54 is within the opening 44 and torque is being applied to the bolt 30.

As is shown, the lower opening 42 of the saddle 10 is oversized relative to the rod body 40 of the bolt 30 in at least one embodiment. Thus, the bolt 30 can be inserted upwardly through opening 42 rather quickly and easily. The openings 46 and 44, in one form, are substantially larger than the upper end portion 50 of bolt 30, so it is quite easy to locate the end portion 50 relative to first opening 42 and the opening 44; thus, the bolt 30 can be quickly inserted through these openings 46 and 44.

Figure 3:
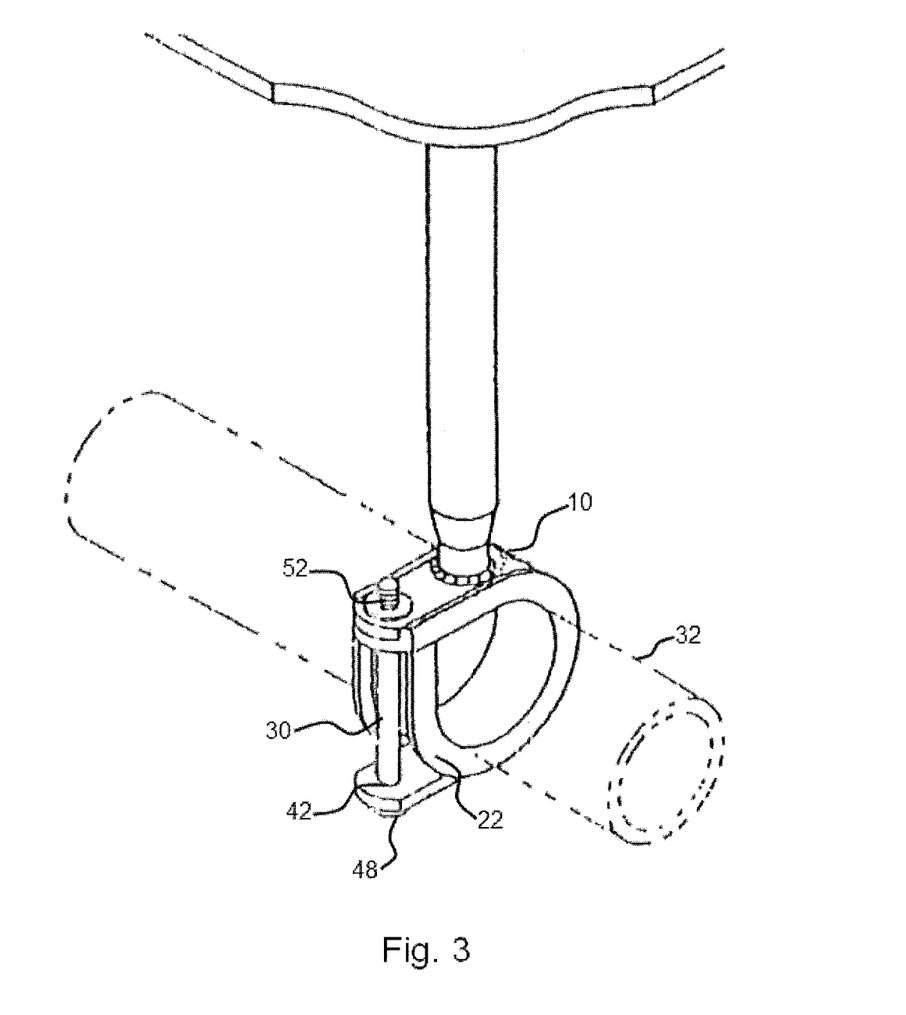
FIG. 3 is an isometric view of an improved side-load hanger in one form.

In accordance with at least one embodiment, the pipe section 32 and the liner 22, shown in FIG. 3, are moved laterally into the open throat of the saddle 10. The liner 22 may be installed first. Then the pipe section 32 may be positioned within the liner 22, and the side portion 28 of the liner preformed or bent upwardly, before the bolt 30 is installed. Alternately, the liner section 22 may be wrapped about the pipe section 32, and the assembly installed in the saddle 10.

Once in position, the bolt 30 is moved upwardly through the openings 42, 46 and 44, as previously discussed. Next, the nut 52 is brought into engagement with the threaded portion 50 of the bolt 30, with the small end portion 54 directed downwardly. The nut 52 is screwed onto the threads 50 until the nut and bolt assembly 52/30 is joined. Then, the assembly 52/30 may be allowed to drop downwardly to place the end portion 54 of the nut 52 into the opening 44. The non-circular opening 44 now functions as a wrench, enabling a single wrench to be used on the bolt head 48 for rotating the bolt 30 a sufficient amount to apply the necessary squeezing or clamping force on the pipe section liner assembly 32/22. As previously described it may be found necessary to push the bolt/nut assembly 30/52 downward to temporarily seat the tapered surface of the nut within the non-circular opening 46 while the bolt is rotated to the correct torque. The objective of this tensioning is positioning of the liner about the pipe to hold the pipe in place against movement and vibration. It is normally not desired to deform the pipe during this installation.

When the nut end portion 54 is within opening 44 and the bolt 30 is tightened, something else happens. The side surfaces of nut portion 54 are moved into contact with the side surfaces of the opening 44. As the bolt head 48 and the nut 52 are drawn together, the shoulder 58 and flange 59 may be drawn into tight engagement with the metal surrounding the opening 44.

The tight fit of nut end portion 54 within the opening 44, and the pressure exerted by the shoulder 58 against the region of upper arm portion 18 which surrounds the opening 44, serve to stiffen the part of arm portion 18, which extends outwardly from the support leg 12 so that it does not tend to bend. This is in contrast with many prior art hangers.

The rod body 40 of bolt 30 may provide an installation clearance fit within the opening 42. As a result, the nut and bolt assembly 52/30 is aligned by the turning force on bolt 30 to a position in which the axis of the bolt 30 extends substantially perpendicular to the surface of arm portion 18, which shoulder 58 bears against. The inner surface of the bolt head 48 exerts a force on the lower arm portion 16. The lower arm portion 16 has a relatively long unsupported portion, and as a result it can bend much more freely than the upper arm portion 18. Thus, the clamping pressure is applied to the pipe section 32 and liner 22 by the lower arm portion 16, bending upwardly toward the upper arm portion 18. The loose fit of bolt body 10 within opening 42 allows relative movement to occur between the bolt body 40 and the lower arm portion 16, so that bending is not apt to occur between the rod body 40 and the surfaces of opening 42, in a manner tending to resist upward deflection of arm portion 16.

In these embodiments, it is possible to round off the outer end portions of arm 18, eliminating sharp corners. The outer end of the lower arm portion 16 is also rounded. The engagement of the nut portion 54 within the opening 44 and the pressure of the shoulder 58 against the arm portion 18 resist bending of arm portion 18, resulting in protection for the weld 14. The weld is not likely to tear as it would if the outstanding part of arm portion 18 were to be bent downwardly, as required by several prior art hangers.

Figure 6:
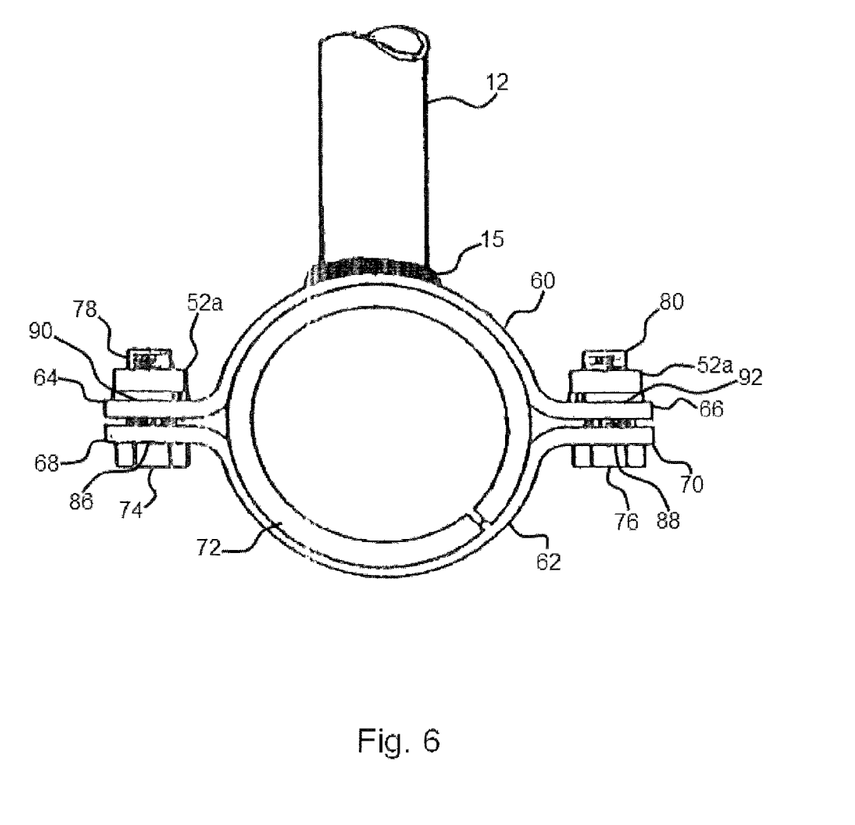
FIG. 6 is a side view of an improved bottom-load hanger in one form.

In the illustrated embodiments of FIGS. 1 and 3, the support leg 12 is a tubular member of substantial diameter, having a reduced diameter, lower end portion. The weld bead 15 extends about the circumference of the reduced diameter end portion. This circumference is relatively long, resulting in a relatively strong weld connection between the support leg 12 and the saddle 10. The reduction of the size of the lower end of the support leg 12 in this embodiment provides more room about the opening 44 for handling and placement of the nut 52. FIG. 6 shows a similar embodiment, without the reduced diameter lower end portion.

It is to be understood that the support leg could be constructed in a number of different ways. It could be a single member, as illustrated, it could take one of the forms disclosed in Applicant's aforementioned U.S. Pat. No. 5,007,604, it could take the two-part form disclosed in U.S. Pat. No. 5,092,547 (also incorporated by reference and entitled "Pipe Hanger with Shock Load Absorbing Support Leg"), as well as other forms.

In use, the pipe hangers are often subjected to very severe shock loads. As a result, it is useful in many applications that the center of the support leg 12 is kept directly above the center of the pipe section 32. For this reason, with some size pipe hangers, it is necessary to reduce the size of the lower end portion of the support leg 12 so that sufficient room exists along side of the support leg 12 to accommodate the flange 59 of the nut 52.

In one embodiment as shown in FIG. 1, the upper portion of the liner 22 is extended out to extend substantially the full length of the upper saddle arm portion 18, and a bolt receiving opening 46 is provided in the web portion 34 of the liner 22. This enables the liner 22 to be connected to the other parts of the hanger during transportation and handling prior to assembly. The use of a removable fastener makes this type of connection possible and convenient. As shown in FIG. 3, when the liner 22 is within the saddle 10 and the nut and bolt assembly 52/30 is installed, the liner 22 is very secure. This is because the liner and saddle surfaces cooperate with the nut and bolt assembly 52/30 to not only connect the liner 22 to the upper saddle leg 18 but also to prevent the liner 22 from flopping around and being in a position to be damaged.

Looking to FIG. 6, there is shown a side view of a standard "T" strap, bottom-load pipe hanger utilizing the disclosed tapered nuts. It comprises a support leg 12 welded at 15 to a midportion of an upper clamp strap 60. A lower clamp strap 62 is provided which is of similar configuration, but this member is in at least one form separable from the rest of the assembly. The midportions of the clamp straps 60 and 62 are generally curved. Each strap includes a pair of ears, 64/66 and 68/70, respectively. The lower clamp strap 62 in one form comprises a first opening 86, and a second opening 88 to receive the first bolt 74 and second bolt 76 respectively. The upper clamp strap 60 in one form comprises a first non-circular opening 90 and a second non-circular opening 92 to receive the first bolt 74 and second bolt 76 respectively, and also to receive and prohibit rotation of the first nut 52a and second nut 52b respectively. A resilient pad or liner 72 is provided within the curved portions of the straps 60 and 62. A liner similar to the liner 22 previously described could also be utilized. In use, the liner 72 is in contact with the pipe, wire bundle, or similar structure. A first bolt 74 extends through aligned openings in the ears 64 and 68, and a second bolt 76 extends through aligned openings in the ears 66 and 70. A nut 52 is threaded onto each of the threaded end portions 78 and 80. The nut and bolt assemblies are screwed together for drawing the two straps 60 and 62 together and into clamping engagement with the pipe. The shank portions of the bolts 30 and 32 are, in one form, smaller in diameter than the openings in the ears 64 and 66 and 68 and 70, so that there is a relatively loose fit of the bolts 52 within the holes. The bolt heads 74 and 76 are most generally located at the bottom of the assembly.

The surface of the bolt heads which contact the surfaces of the ears 68 and 70 are normally flat, and the nuts 52 are formed as described above. They present a tapered, noncircular surface to the holes in the ears 64 and 66, and a tapered or flat surface 90 to the surface of the ears 64 and 66.

The hanger shown in FIG. 6 is recognized as being strong and the pressure of the straps 60 and 62 on the pipe can be easily adjusted by regulating the tightening of the nut and bolt assemblies.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. An improved pipe receiving saddle assembly comprising a first arm portion a second arm portion the improvement comprising:
   a) a bolt comprising a rod body, an enlarged head at the first end of said rod body and a threaded end portion at the second end of said rod body;
   b) an improved nut comprising a central opening that is at least partially threaded with female threads which complement the male threads on the bolt, said nut including a tapered small end portion having a cross-sectional shape that is other than circular, and a flange portion substantially larger in diameter than the tapered small end portion;
   c) a surface defining a first arm opening in said first arm portion, wherein the first arm opening is smaller in size than the head of the bolt and is larger in size than the rod body of the bolt;
   d) a surface defining a non-circular opening in said second arm portion, said non-circular opening being substantially larger in size than the rod body of the bolt, and smaller in size than the flange portion of the nut,
   e) the non-circular opening having the same non-circular cross sectional shape as the tapered small end portion of the nut to receive the tapered small end portion of the nut, and hold said nut against rotation;
   f) wherein the non-circular surface of the tapered small end of the improved nut is angularly tapered from a radially smaller distal portion radially outward to a radially larger proximal portion adjacent the flange portion wherein the larger proximal portion of the non-circular surface of the improved nut removably engages the surface defining the non-circular opening;
   g) whereby the larger proximal portion of the tapered end of the nut centered within the surface defining the non-circular opening holds the nut against rotation while the bolt is being rotated;
   h) a locking insert provided within the central opening of the nut;
   i) wherein the tapered small end portion of the nut is positioned within the non-circular opening in the second arm portion;
   j) the flange portion is in contact with the second arm surface; and
   k) wherein the locking insert is longitudinally opposite the small tapered end portion of the nut.

2. The improved pipe receiving saddle assembly as recited in claim 1 further comprising: a flexible, shock absorbent liner configured to interoperate with the saddle, the liner comprising:
   a) an elongated side portion that extends along an inner surface of the saddle, and
   b) a side portion which is configured to extend along side of a bolt, between the bolt and the pipe section.

3. The improved pipe receiving saddle assembly as recited in claim 1 wherein the flange portion is tapered to further center the nut within the non-circular opening of the second arm portion.

4. The improved pipe receiving saddle assembly as recited in claim 1 further comprising a single-arm support leg having a first end attached to the first arm portion and a second end attached to a support structure such as an interior overhead portion of a vessel.

* * * * *